July 8, 1947.     L. R. FLIPPEN ET AL     2,423,646
BATTERY CHARGER WITH REVERSIBLE FEATURE
Filed Feb. 6, 1945
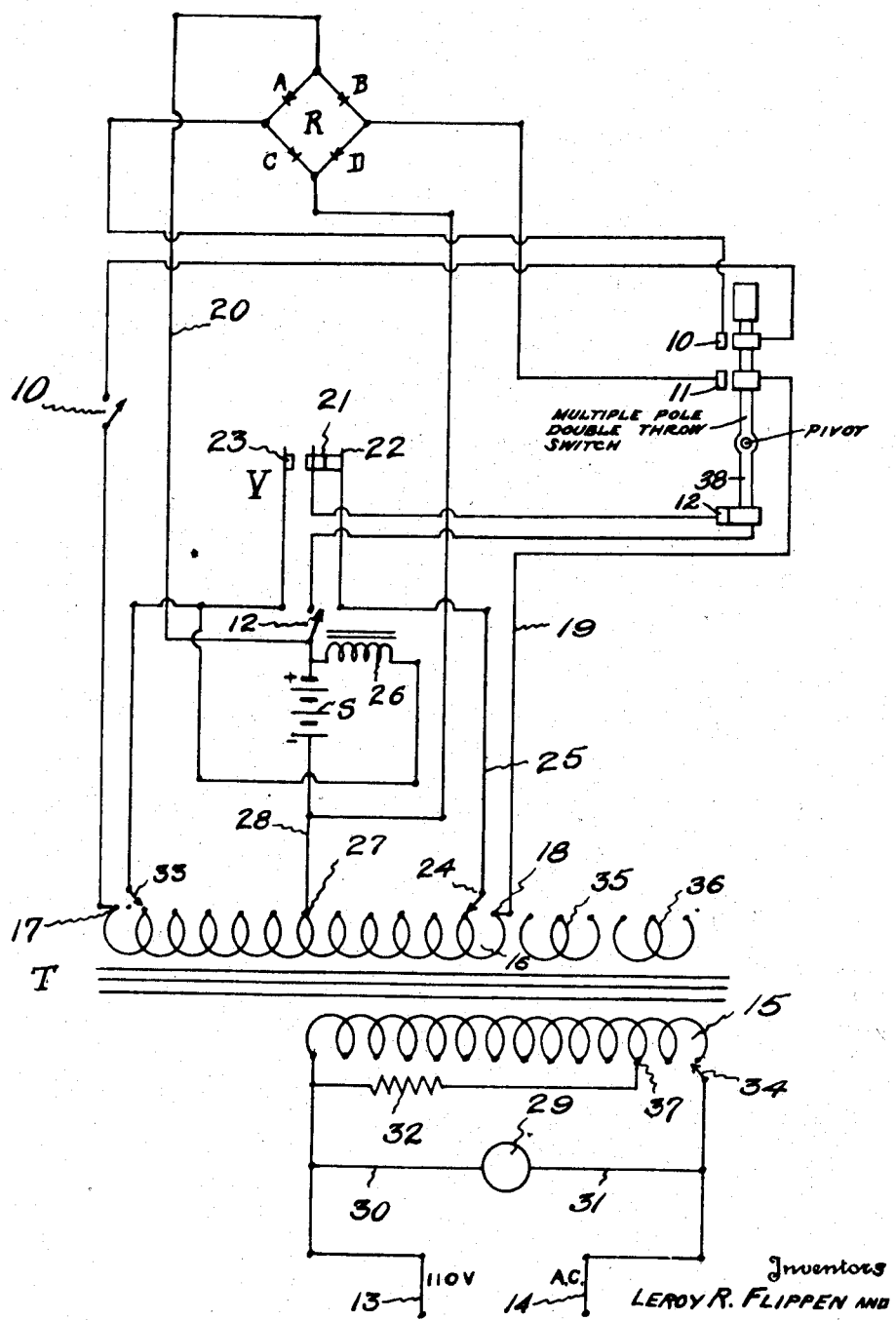
Inventors
LEROY R. FLIPPEN AND
FRED L. HENNEFER
Attorney Patented July 8, 1947

2,423,646

UNITED STATES PATENT OFFICE 2,423,646

BATTERY CHARGER WITH REVERSIBLE FEATURE

Leroy R. Flippen, Clearfield, and Fred L. Hennefer, Kaysville, Utah

Application February 6, 1945, Serial No. 576,470

8 Claims. (Cl. 175—363)

This invention relates to a battery charger having a reversible feature which may be used as a source of alternating current, and has for one of its objects the production of a simple and efficient battery charger which may be utilized as a 120 volt A. C. source of power for small appliances, such as an electric razor, and may also be used to charge an automobile battery by simply plugging one end of an electric cord into an automobile radio and the other end of the cord into a 120 volt A. C. outlet to provide a source of charging current.

Another object of this invention is the production of a simple and efficient single unit battery charger which is provided with a reversible feature to permit the use of the unit also as a source of current supply.

Other objects of the invention will appear throughout the following specification and claims.

In the drawing the figure is a diagram of the circuit employed in the single unit battery charger and source of current supply.

By referring to the drawing, it will be seen that the present device embodies a circuit principally including a rectifier R, a vibrator V, and a transformer T. The present device is intended to be used as a battery charger, and also as a source of alternating current while using a direct current supply.

When the device is used as a battery charger, switches 10 and 11 are closed while switch 12 is opened. The leads or lines 13 and 14 are plugged into a suitable 110 v. A. C. source of electrical supply, which energizes coil 15 on the transformer T. This coil 15 when energized with alternating current induces an alternating current in the coil 16 on the same core of the transformer T. The current thus induced in coil 16 when flowing from points 17 to 18 of said coil, passes through the conductor 19 and switch 11 to the rectifier R, that is to say through the section D of the rectifier and thence to the positive terminal of the battery S by way of the conductor 20. The current passes through the battery S, thereby charging the battery. From the battery S, the current passes out through the negative terminal to the rectifier R, where the current passes through the section A of the rectifier and back to the end 17 of the coil 16, thereby completing the circuit.

When the device is used as a source of alternating current from a direct current supply the switch 10 and the switch 11 are opened and the current will then flow from the battery S through the switch 12 and contacts 21 and 22 of the vibrator V, the contacts 21 and 22 being normally closed. When the contacts 21 and 22 are closed, the current will pass through the switch 24 from the contact 22 and through the conductor 25 and then out through the point 18 of the transformer T, then back to the battery S through the conductor 19, through the rectifier R and conductor 20 to the battery S, thereby completing the circuit.

While this current is flowing, contacts 21 and 23 are open and the armature coil 26 which actuates the movable contact 21 of the vibrator V is energized and pulls the contact 21 toward the contact 23 of the vibrator. When the contacts 21 and 23 are closed, the current will then flow from the battery S through contacts 21 and 23 and from point 17 to point 27 of the coil 16 of the transformer T. The current then returns to the battery S through the conductor 28 which is connected to point 27 and to the negative side of the battery S. This will complete the circuit. When the contacts 21 and 23 are closed, the armature coil 26 is short-circuited, and the contact 21 returned to its normal position in contact with the contact 22. Thus it can be seen that the contact 21 will vibrate between the contacts 22 and 23 making contact with contact 23 and contact 22 alternately, thereby allowing the current to flow alternately from point 18 to point 27 and also from point 17 to point 27 in the coil 16 of the transformer T.

As this current flows in coil 16 of the transformer T an alternating current is induced in the coil 15 of the transformer which may be utilized by plugging an appliance into the outlet 29 of the conventional type, the outlet 29 being connected to the conduits 30 and 31, as shown. A resistor 32 of high resistance and low wattage is connected across the coil 15 of the transformer T to prevent excessive voltage from being produced which might damage the insulation on the winding or coil 15. Switch 33, switch 24, and switch 34, are included for voltage variation and may be actuated to provide for such variation in the conventional manner.

Additional coils 35 and 36, for example, are included on the core of the transformer T for current supply of different voltages, such for instance as plate or filament supply for radio tubes. As shown, the conduits 30 and 31 are respectively connected to the leads or lines 13 and 14 and the resistor 32 is connected at one end to the line 13, and the other end to a point 37 contacting the coil 15.

It should be noted that the present device employs a single pole double throw vibrator V which makes the battery charger reversible, that is to say, the ordinary battery charger will charge an ordinary 6 volt automobile storage battery from a 120 volt alternating current source. The present device, however, in addition to charging a battery may also be used to deliver 120 volt alternating current from a 6 volt direct current source such as a standard automobile 6 volt storage battery. As previously stated, when the device is used as a charger, the high voltage winding of the transformer T is connected to 115 volt source by means of a cord and attachment plug of the conventional type. A multiple pole double throw switch 38 is provided of the conventional type and is thrown to the charge position which connects the secondary coil of the transformer through the rectifier to the battery to be charged. The current from the secondary of the transformer is then rectified and both waves are used to charge the battery, the vibrator being eliminated from the circuit.

When the device is used to operate 120 volt A. C. appliances from a 6 volt source of electrical supply, the multi-pole double throw switch provided with the device is thrown from the charge position to "120-volt" position, which disconnects the rectifier and connects the vibrator and low voltage transformer winding in the battery circuit. The vibrator then begins to operate, allowing the current to flow from the battery through the low voltage winding of the transformer, first in one direction and then in the opposite direction as described above, thereby inducing an alternate current in the adjoining winding 15. The appliance is plugged into the convenience outlet to receive the current to be supplied. A protective resistor is placed across the high voltage winding to limit the induced voltage to the insulation value of the winding. A circuit breaker also may be provided to protect the equipment.

The present device may be made of any size desired, but it should be borne in mind that the present device embodies a combination included in a single unit, thereby providing a new device of great value, convenience, and usage, and which single unit has not heretofore been produced. The novel idea of incorporating the features of this device in the design of an automobile radio when constructing the device for the market will prove a convenient instrument for a user at a relatively small increase of investment, and will have the convenience of a 120 volt A. C. source of power for small appliances, such for instance as electric razors, and the like, small fans, and other equipment, and in addition means has been provided whereby the automobile battery may be charged while still in the automobile by simply plugging an electric cord into the radio or instrument embodying the circuit above described, and by plugging the cord also into a 120 volt A. C. outlet. It should also be noted that the present device may be used to charge batteries installed in other places, as well as in batteries installed in automobiles.

The present application has been confined to the illustration of the circuit embodying the present invention which may be employed in conjunction with an automobile radio to facilitate the mounting of the device conveniently upon an automobile, and it is believed that the construction and operation of the circuit will be clearly understood and that an illustration of the casing or housing in which the circuit is mounted is not necessary for a complete and proper understanding of the present invention.

Having described the invention, what we claim is:

1. In combination, a storage battery, a rectifier, a vibrator, and a transformer, the transformer having means for connection with a source of A. C. current, a circuit connecting the vibrator with said transformer and the battery, a circuit connecting said rectifier with said transformer, vibrator and battery, and switches located in said circuits for selectively rendering said circuits active at different times in a manner whereby one circuit may be used as a source of A. C. current supply from a D. C. current source at one time, and another circuit may be used as a battery charging circuit to charge the battery from an A. C. source of supply at another time.

2. In combination, a storage battery, a rectifier, a vibrator, and a transformer, the transformer having means for connection with a source of A. C. current, a circuit connecting the vibrator with said transformer and the battery, a circuit connecting said rectifier with said transformer, vibrator and battery, a vibrator circuit connected at one end to the positive side of said battery and at the other end to said vibrator and to said transformer, the negative side of the battery being connected to said transformer, said vibrator circuit including an armature coil which is adapted to be short-circuited to cause the contacts of said vibrator to alternately make and break the vibrator circuit and to cause alternate current to flow through said transformer.

3. In combination, a storage battery, a rectifier, a vibrator, and a transformer, the transformer having means for connection with a source of A. C. current, a circuit connecting the vibrator with said transformer and the battery, a circuit connecting said rectifier with said transformer, vibrator and battery, and switches located in said circuits for selectively rendering said circuits active at different times in a manner whereby one circuit may be used as a source of A. C. current supply from a D. C. current source at one time, and another circuit may be used as a battery charging circuit to charge the battery from an A. C. source of supply at another time, and additional coils carried by said transformer for providing current supply of different voltages.

4. In combination, a storage battery, a rectifier, a vibrator, and a transformer, the transformer having means for connection with a source of A. C. electrical supply, a circuit connecting the transformer with the rectifier, and a battery charging circuit connecting the rectifier with the terminals of said battery and transformer.

5. In combination, a storage battery, a rectifier, a vibrator, and a transformer, the transformer having means for connection with a source of A. C. electrical supply, a circuit connecting the transformer with the rectifier, a battery charging circuit connecting the rectifier with the terminals of said battery and transformer, a vibrator control circuit connected to said battery, transformer and rectifier, and a multi-pole double throw switch for disconnecting said rectifier and connecting the vibrator and the low voltage transformer winding of the battery circuit.

6. In combination, a storage battery, a rectifier, a vibrator, and a transformer, the transformer having means for connection with a source of A. C. electrical supply, a circuit connecting the transformer with the rectifier, a battery charging circuit connecting the rectifier with the terminals of said battery and transformer, a vibrator control circuit connected to said battery, transformer and rectifier, a multi-pole double throw switch for disconnecting said rectifier and connecting the vibrator and the low voltage transformer winding of the battery circuit, the transformer having a high voltage winding, an appliance outlet carried by the transformer, and a protective resistor pieced across the high voltage winding to limit the induced voltage to the insulation value of the windings of the transformer.

7. In combination, a storage battery, a rectifier, a vibrator, and a transformer, the transformer having means for connection with a source of A. C. electrical supply, a circuit connecting the transformer with the rectifier, a battery charging circuit connecting the rectifier with the terminals of said battery and transformer, a vibrator control circuit connected to said battery, transformer and rectifier, a multi-pole double throw switch for disconnecting said rectifier and connecting the vibrator and the low voltage transformer winding of the battery circuit, and an armature coil in the vibrator control circuit adapted to be short-circuited to permit current to alternately flow through said transformer.

8. In combination, a storage battery, a rectifier, a vibrator, and a transformer, the transformer having means for connection with a source of A. C. electrical supply, a circuit connecting the transformer with the rectifier, a battery charging circuit connecting the rectifier with the terminals of said battery and transformer, a vibrator control circuit connected to said battery, transformer and rectifier, a multi-pole double throw switch for disconnecting said rectifier and connecting the vibrator and the low voltage transformer winding of the battery circuit, and an armature coil in the vibrator control circuit adapted to be short-circuited to permit current to alternately flow through said transformer, said transformer having an induction coil in which induction coil a current is induced from said low voltage transformer winding, and an appliance connecting circuit connected to said induction coil.

LEROY R. FLIPPEN.
FRED L. HENNEFER.

REFERENCES CITED

The following references are of record in the file of this patent:

UNITED STATES PATENTS

| Number | Name | Date |
|---|---|---|
| 285,714 | Weston | Sept. 25, 1883 |
| 1,132,986 | Turbayne | Mar. 23, 1915 |
| 1,787,850 | Wolf | Jan. 6, 1931 |
| 1,954,931 | Hambuechen | Apr. 12, 1934 |
| 2,094,481 | Warren | Sept. 28, 1937 |
| 2,021,380 | Raskhodoff | Nov. 19, 1935 |
| 2,032,424 | Lear et al. | Mar. 3, 1936 |
| 2,088,409 | Dozier | July 27, 1937 |
| 2,089,512 | Upp | Aug. 10, 1937 |
| 2,121,421 | Burt | June 21, 1938 |
| 2,176,447 | Vilkomerson | Oct. 17, 1939 |
| 2,179,118 | De Witt et al. | Nov. 7, 1939 |
| 2,229,729 | Emde | Jan. 28, 1941 |
| 2,253,131 | MacGregor | Aug. 19, 1941 |
| 2,364,802 | Mason | Dec. 12, 1944 |